United States Patent [19]

Fickett et al.

[11] Patent Number: 5,100,054
[45] Date of Patent: Mar. 31, 1992

[54] VEHICLE TRACTION ASSIST DEVICE

[76] Inventors: Richard C. Fickett, 38 E. Balboa Dr., Tempe, Ariz. 85282; Glenn A. Fickett, 350 E. Taylor St., Tempe, Ariz. 85281

[21] Appl. No.: 574,483
[22] Filed: Aug. 28, 1990
[51] Int. Cl.5 .............................................. B60C 27/00
[52] U.S. Cl. ........................................ 238/14; 152/208
[58] Field of Search .......................... 238/14; 152/208

[56] References Cited

U.S. PATENT DOCUMENTS

| 1,400,478 | 12/1921 | Deschamps | 238/14 |
|---|---|---|---|
| 2,496,119 | 1/1950 | Cesen | 238/14 |
| 2,619,289 | 11/1952 | Plante | 238/14 |
| 3,025,002 | 3/1962 | Kunz | 238/14 |
| 3,069,090 | 12/1962 | Ginsberg | 238/14 |
| 3,357,639 | 12/1967 | Peterson | 238/14 |
| 3,858,803 | 1/1975 | Gantert | 238/14 |
| 3,878,988 | 4/1975 | Blais | 238/14 |
| 3,910,491 | 10/1975 | Ducharme | 238/14 |
| 3,997,110 | 12/1976 | Aumont | 238/14 |
| 4,121,765 | 10/1978 | Fosteris | 238/14 |
| 4,265,399 | 5/1981 | Covington | 238/14 |
| 4,360,153 | 11/1982 | Mantion et al. | 238/14 |
| 4,361,277 | 11/1982 | Cannady et al. | 238/14 |
| 4,787,556 | 11/1988 | Heisson | 238/14 |

FOREIGN PATENT DOCUMENTS

| 1018203 | 9/1977 | Canada | 238/14 |
|---|---|---|---|
| 1023403 | 12/1977 | Canada | 238/14 |
| 1630184 | 10/1969 | Fed. Rep. of Germany | 238/14 |
| 2453737 | 12/1980 | France | 238/14 |

Primary Examiner—Frank E. Werner
Assistant Examiner—James Eller
Attorney, Agent, or Firm—Donald J. Lisa

[57] ABSTRACT

A vehicle traction assist device about two feet long that is adapted to be placed at a drive wheel of the vehicle and is stamped from a flat plate of 11 gage cold rolled steel. Apertures are punched out to provide cross bars (30, 32, 34) that are given a 90° twist at each end to provide a central blade portion that engages both the tire tread and the underlying surface.

5 Claims, 1 Drawing Sheet

VEHICLE TRACTION ASSIST DEVICE

This invention relates to a gripper member that is adapted for use as a traction aid for vehicles.

BACKGROUND

Traction enhancing devices for passenger cars and small trucks that are manually portable have been subject to a number of prior art patents including Deschamps U.S. Pat. No. 1,400,478 granted in 1921. Many more recent devices are especially adapted for use in snow, ice, sand and/or mud and accordingly have features which provide enhanced assistance for special applications. All of the prior art of which we are aware either involves fabrication, usually by welding various parts together or by casting to form a grip enhancing device for use at the drive wheels of the vehicle.

SUMMARY OF INVENTION

It is an object of the present invention to provide a novel gripper member that is made from one piece of flat plate material.

Another object is to provide a novel gripper member having a rigid perimeter with stamped aligned apertures separated by cross bars. The cross bars are given a torsional bend or twist at each end to provide a central blade portion that engages both the tire tread and the underlying surface. Teeth may be provided at opposite ends of each cross bar which serve as traction cleats.

A further object of the invention is to provide a configuration for the gripper member so that during a stamping operation, the cutouts and configuration can be made from a flat plate and the various bends and twists performed to thus provide reduced manufacturing costs. In a preferred embodiment, no welding is required and the entire gripper member is fabricated from a single flat plate of cold rolled steel.

These and other objects will become apparent from the claims, and from the description as it proceeds in conjunction with the appended drawings.

DETAILED DESCRIPTION OF PREFERRED EMBODIMENT

Figure 1:
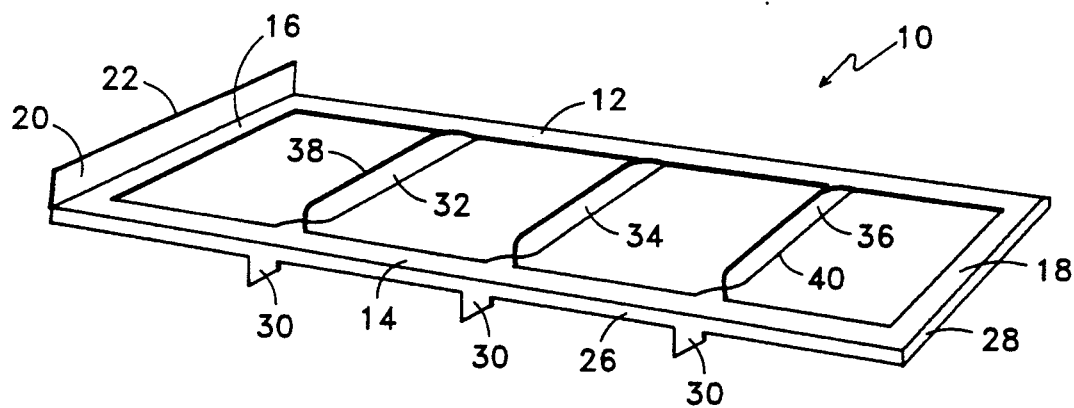
FIG. 1 is a pictorial view of a traction aid gripper member according to the present invention.

Referring to FIG. 1, the gripper member 10 has a rectangular shape with a length of about 2 feet and width that is about one-third of its length. Member 10 is formed with two longitudinally extending edge rails 12, 14, a front cross member 16 and a rear cross member 18. The front cross member 16 has an up-standing lip 20 with an edge 22 that is adapted to engage a tire tread. The edge rails 12 and 14 and the rear cross member 18 all have a downwardly extending lips 24, 26 and 28, respectively, to provide rigidity to the member 10 and to prevent permanent deformation due to torsional and longitudinal bending forces. The downwardly extending lips 24 and 26 also resist sliding in a sidewise direction. The lower profile of lips 24 and 26 is provided with downwardly extending teeth 30 shaped to form ground surface engaging traction cleats.

The member 10 may be formed from a flat plate of 11 gage cold rolled steel having substantially uniform thickness. The outer perimeter of the flat plate may be cut and the lips bent in suitable metal press. At the same time, a group of apertures, four in the illustrated embodiment, may be formed as cutouts. The aperture size preferred is rectangular having dimensions of about 4×6 inches thereby leaving three cross bars 32, 34 and 36 each having a width in the longitudinal direction of about one inch when measured in the plane of the plate. The cross bars 32, 34 and 36 are preferably aligned when measured with corresponding teeth 30.

Figure 2:
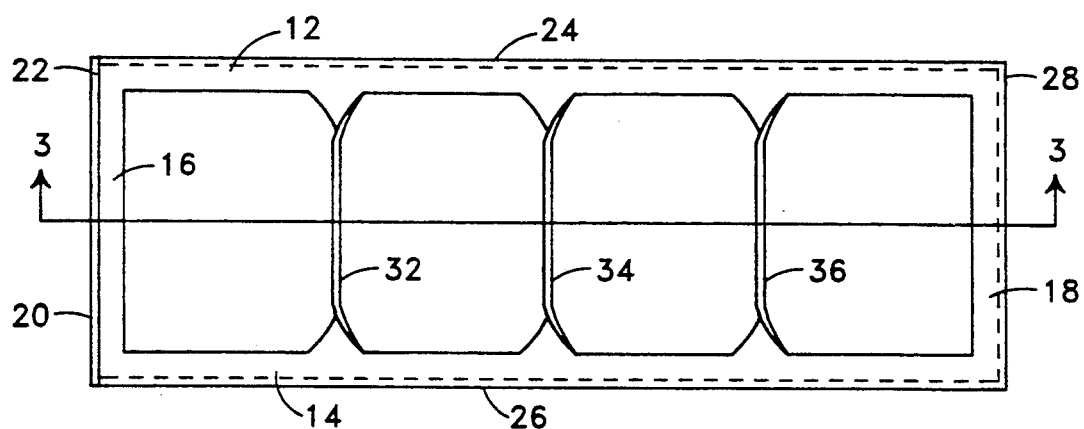
FIG. 2 is a top plan view of the gripper member of FIG. 1.
Figure 3:
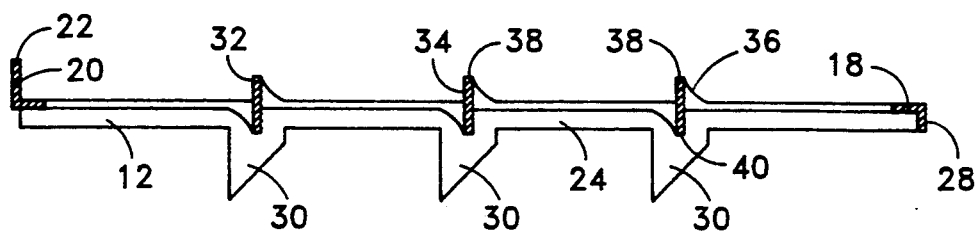
FIG. 3 is an elevation in section taken along line 3—3 of FIG. 2.

Each of the cross bars 32, 34 and 36 is bent by a 90° twist in a counterclockwise direction as viewed in FIGS. 2 and 3 at each end adjacent the edge rails 12 and 14. After being bent to the position as illustrated in the drawings, cross bars 32, 34 and 36 each form blades having a vertically disposed central portion with an upper edge surface 38 that extends above the plane of the plate and a lower edge surface 40 that extends downwardly to be in position to engage the ground or other support surface to enhance the traction properties of the gripper member 10. Since the cross bars can be twisted in a stamping operation, the upper edge surface 38 and the lower edge surface 40 of the central portions of the cross bars 32, 34 and 36 may be symmetrically disposed about the central plane of the flat metal plate.

The direction of the twist is advantageously chosen to be such that when the gripper member 10 is used, the applied force tends to increase the twist angle.

The gripper member 10 of the present invention is especially well adapted for use in loose gravel on mountain roads as well as in snow, ice or mud. It is constructed in its preferred form as an integral, one piece member that is sufficiently light weight to be easily carried manually and is sufficiently strong to maintain its configuration with vehicles of ordinary weight. Accessories may be attached as desired.

It should be recognized that changes and modifications can be made without departing from the spirit of the invention. All variations which fall within the scope of the attached claims and equivalents thereof are intended to be covered.

We claim:

1. A manually portable vehicle traction assisting grip member for use as a traction aid for vehicles comprising:
   (a) a substantially rectangular one piece frame that has been formed from a single flat metal plate during a stamping operation said plate having a predetermined thickness, said frame having a longitudinal axis extending along a length thereof and a lateral axis perpendicular thereto, said frame further having an upper plane formed by an upper surface of the plate and a lower plane formed by a lower surface of the plate;
   (b) said grip member having laterally spaced longitudinally extending side rails including first surface portions lying in the upper plane of the plate which are substantially wider than the thickness of the plate, and including second portions extending downwardly below said frame lower plane, a first cross member extending between said rails at one end of said member and having an upstanding tire thread engaging lip, and a second cross member having a surface portion lying in said upper plane which is substantially wider than the thickness of said plate and extending between said rails at an opposite end of said member, said second cross member having a lip extending downwardly below said lower plane; and (c) a plurality of cross strips extending between said side rail surface portions, said cross strips being formed from said flat metal plate as an integral part of said grip member side rail surface portions and having a width as measured in the longitudinal direction of the grip member that is greater than the thickness of the metal plate, said cross strips being spaced along the length of said grip member to form a plurality of apertures defined by said side rails and adjacent cross strips, each of said cross strips being twisted about a laterally extending axis of rotation in the same rotational direction during said stamping operation through an angle of about 90° at opposite ends adjacent to respective side rails to form a central blade portion having a lower ground engaging traction edge extending downwardly below said lower plane and an upper tire tread engaging edge extending upwardly above said upper plane.

2. The traction aid as defined in claim 1 wherein said side rail second portions comprises downwardly extending lips along outer edges of said first surface portions, said lips having a profile at each cross bar which includes a downwardly extending tooth shaped to form a ground engaging traction cleat.

3. The traction aid as defined in claim 2 wherein the thickness of the cross strips is substantially equal to the thickness of the metal plate and wherein the first and second cross member lips extend transversely between opposite side rails and each has an edge thickness substantially equal to the thickness of the metal plate.

4. The traction aid as defined in claim 3 of the grip member has a length of about two feet and the metal plate is 11 gage cold rolled steel and is free of weldments.

5. The traction aid as defined in claim 1 wherein the thickness of the cross strips is equal to the thickness of the metal plate and wherein the first and second cross member lips extend transversely between opposite side rails and each have an edge thickness equal to the thickness of the metal plate to provide resistance to torsional bending of the grip member.

* * * * *